US012519217B2

(12) United States Patent
Tian et al.

(10) Patent No.: US 12,519,217 B2
(45) Date of Patent: Jan. 6, 2026

(54) DISPLAY APPARATUS AND ELECTRONIC DEVICE

(71) Applicants: HUAWEI TECHNOLOGIES CO., LTD., Shenzhen (CN); BEIJING BOE SENSOR TECHNOLOGY CO., LTD, Beijing (CN)

(72) Inventors: Ruiyuan Tian, Helsinki (FI); Lin Yuan, Shanghai (CN); Weibo Peng, Shenzhen (CN); Wei Shan, Shanghai (CN); Yu Chan Yang, Dongguan (CN); Hai Yu, Beijing (CN); Liang Guo, Beijing (CN); Yafei Zhang, Beijing (CN); Wenjie Xu, Beijing (CN); Xiaodong Xie, Beijing (CN)

(73) Assignees: Huawei Technologies Co., Ltd., Shenzhen (CN); BEIJING BOE SENSOR TECHNOLOGY CO., LTD, Beijing (CN)

( * ) Notice: Subject to any disclaimer, the term of this patent is extended or adjusted under 35 U.S.C. 154(b) by 119 days.

(21) Appl. No.: 18/566,940

(22) PCT Filed: Apr. 29, 2022

(86) PCT No.: PCT/CN2022/090148
§ 371 (c)(1),
(2) Date: Dec. 4, 2023

(87) PCT Pub. No.: WO2022/252899
PCT Pub. Date: Dec. 8, 2022

(65) Prior Publication Data

US 2024/0258689 A1 Aug. 1, 2024

(30) Foreign Application Priority Data

Jun. 3, 2021 (CN) ......................... 202110619322.4

(51) Int. Cl.
*H01Q 1/38* (2006.01)
*H01Q 1/24* (2006.01)
*H01Q 9/04* (2006.01)

(52) U.S. Cl.
CPC ............... *H01Q 1/38* (2013.01); *H01Q 1/243* (2013.01); *H01Q 9/045* (2013.01)

(58) Field of Classification Search
CPC ........... H01Q 1/38; H01Q 1/243; H01Q 9/045
See application file for complete search history.

(56) References Cited

U.S. PATENT DOCUMENTS

2014/0055402 A1 2/2014 Cok

FOREIGN PATENT DOCUMENTS

CN 2925294 Y 7/2007
CN 201248581 Y 6/2009
(Continued)

OTHER PUBLICATIONS

Park et al., "An Optically Invisible Antenna-on-Display Concept for Millimeter-Wave 5G Cellular Devices," IEEE Transactions on Antennas and Propagation, vol. 67, No. 5, XP011722871, Total 11 pages (May 2019).

(Continued)

*Primary Examiner* — Graham P Smith
(74) *Attorney, Agent, or Firm* — Leydig, Voit & Mayer, Ltd.

(57) ABSTRACT

This application provides a display apparatus and an electronic device. A transparent dielectric layer is added to the display apparatus, metal is deposited on the transparent dielectric layer, to form a metal grid, and a part of the metal grid is used as a radiator of an antenna structure. After an antenna is integrated into the display apparatus, through optimization of an optical design, the metal grid may meet a requirement for optical transmittance, and display effect is
(Continued)

not obviously affected. In addition, because the antenna structure is integrated into the display apparatus, coverage space of a wireless signal is increased. This avoids occurrence of a signal blind region, so that the electronic device has a more reliable connection in a millimeter-wave band, to meet a communication requirement.

20 Claims, 11 Drawing Sheets

(56) References Cited

FOREIGN PATENT DOCUMENTS

| | | | |
|---|---|---|---|
| CN | 201422690 | Y | 3/2010 |
| CN | 103329642 | A | 9/2013 |
| CN | 107495782 | A | 12/2017 |
| CN | 109411873 | A | 3/2019 |
| CN | 110190397 | A | 8/2019 |
| CN | 110718739 | A | 1/2020 |
| CN | 111430443 | A | 7/2020 |
| CN | 111564692 | A | 8/2020 |
| CN | 111610883 | A | 9/2020 |
| CN | 111952717 | A | 11/2020 |
| CN | 114696079 | A | 7/2022 |
| CN | 115004137 | A | 9/2022 |
| CN | 115441158 | A | 12/2022 |
| CN | 116868441 | A | 10/2023 |
| EP | 0911906 | A2 | 4/1999 |
| KR | 102258790 | B1 | 5/2021 |
| WO | 2021085919 | A1 | 5/2021 |

OTHER PUBLICATIONS

Hong et al., “Optically Invisible Antenna Integrated within an OLED Touch Display Panel for IoT Applications,” IEEE Transactions on Antennas and Propagation, Total 6 pages (May 2017).

DISPLAY APPARATUS AND ELECTRONIC DEVICE

This application is a national stage of International Application No. PCT/CN2022/090148, filed on Apr. 29, 2022, which claims priority to Chinese Patent Application No. 202110619322.4, filed on Jun. 3, 2021. Both of the aforementioned applications are hereby incorporated by reference in their entireties.

TECHNICAL FIELD

This application relates to the field of wireless communication, and in particular to a display apparatus and an electronic device.

BACKGROUND

With rapid development of wireless communication technologies, a 5th generation (5G) mobile communication system is developed on a large scale, and a key difference between a 5G new radio (NR) network and a 4G (4th generation) network is using a commercial wireless millimeter-wave spectrum.

Based on a radio channel, 5G NR operating on a millimeter-wave band may be classified into two types: (1) a fixed service, for example, fixed wireless access (FWA), customer premise equipment (CPE), and a base station; and (2) a mobile service, for example, user equipment such as a mobile terminal and a cellular terminal. Two services need to be run in a millimeter-wave ecosystem simultaneously and seamlessly.

Similar to the CPE and the base station in the millimeter-wave fixed service, an electronic device in the millimeter-wave mobile service reduces a path loss in free space by using a preset antenna array configuration, that is, performing beamforming, and generates a high directional electromagnetic beam at a specified direction angle. The beam is determined by an amplitude and a phase of each antenna in the antenna array. This is different from an antenna used by an electronic device operating below 6 GHZ. In the electronic device operating below 6 GHz, an antenna is generally an omnidirectional beam antenna. Such spherical beam can implement full coverage, to avoid a wireless signal blind region caused by movement of the electronic device. However, for an electronic device operating in a millimeter-wave band, to implement fast steering of a high-directivity antenna beam on a sphere, a highly complex phased array antenna beam control system is required. Due to a compact structure of the electronic device and limited use of physical space, a current millimeter-wave antenna is mainly in a planar shape, to facilitate integration. For the electronic device operating in the millimeter-wave band, spherical coverage may be implemented through a plurality of phased array antennas.

SUMMARY

This application provides a display apparatus and an electronic device. A transparent dielectric layer is added to the display apparatus, and metal is deposited on the transparent dielectric layer to be used as an antenna radiator. The deposited metal forms a grid and meets a requirement for optical transmittance. After an antenna is integrated into the display apparatus, through optimization of an optical design, display effect is not obviously affected. In addition, because an antenna structure is integrated into the display apparatus, coverage space of a wireless signal is increased. This avoids occurrence of a signal blind region, so that an electronic device has a more reliable connection in a millimeter-wave band, to meet a communication requirement.

According to a first aspect, a display apparatus is provided. The display apparatus includes: a cover plate, a display panel, a metal grid, and a transparent dielectric layer. The transparent dielectric layer is disposed between the cover plate and the display panel. The metal grid includes a plurality of grid subunits and is located on a surface of the transparent dielectric layer. The metal grid includes a first region and a second region. A gap is formed between the first region and the second region. The first region includes a first antenna element. The first antenna element includes a radiation component and a feed component. One end of the feed component is electrically connected to the radiation component, and a width of the feed component is greater than or equal to a width of the grid subunit.

In this embodiment of this application, the metal grid is disposed on the transparent dielectric layer, and a part of the metal grid is used as an antenna structure. Through optimization of an optical design, the metal grid may meet the requirement for optical transmittance, and display effect is not obviously affected. In addition, because the antenna structure is integrated into the display apparatus, coverage space of a wireless signal is increased. This avoids occurrence of a signal blind region, so that the electronic device has a more reliable connection in a millimeter-wave band, to meet a communication requirement.

With reference to the first aspect, in some embodiments of the first aspect, the grid subunit is rhombic.

In an embodiment of this application, the grid subunit may be a triangle, a square, a rectangle, a hexagon, an octagon, a "Φ" shape, or a "zigzag" shape. This is not limited in this application.

With reference to the first aspect, in some embodiments of the first aspect, the width L1 of the feed component satisfies the following formula:

$$L1 \geq 2 \times L2 \times \sin\frac{\theta}{2},$$

where

L2 represents a side length of the grid subunit, and 0 represents an included angle in the grid subunit in a current direction of the feed component. In this embodiment of this application, the width of the feed component may be greater than or equal to the width of the grid subunit, to ensure good transmission of an electrical signal.

With reference to the first aspect, in some embodiments of the first aspect, an acute angle in the grid subunit is between 45° and 90°.

In an embodiment of this application, the acute angle $\alpha$ in the grid subunit may be between 45° and 90°, and correspondingly, an obtuse angle $\beta$ may be between 90° and 135°, to ensure good visual effect for a user, and improve user experience.

With reference to the first aspect, in some embodiments of the first aspect, a width corresponding to an acute angle in the grid subunit is between 250 μm and 300 μm.

With reference to the first aspect, in some embodiments of the first aspect, a width corresponding to an obtuse angle in the grid subunit is between 400 μm and 450 μm.

With reference to the first aspect, in some embodiments of the first aspect, the width of the grid subunit is less than 500 μm.

In an embodiment of this application, when a distance between pixel points on the display panel is 100 μm, a width corresponding to an acute angle of a corresponding grid subunit is between 250 μm and 300 μm, and a width corresponding to an obtuse angle of a corresponding grid subunit is between 400 μm and 450 μm. This can avoid generating an excessively strong moire, affecting user experience. In addition, the width (the widths that are corresponding to the acute angle and the obtuse angle) may be less than 500 μm. In this way, impedance of a grid subunit forming the first antenna element may be relatively low; to enable the first antenna element to obtain antenna radiation efficiency that is high enough.

With reference to the first aspect, in some embodiments of the first aspect, the feed component includes at least one of the grid subunits in a width direction.

In an embodiment of this application, at least one complete grid subunit is not split by the gap. In this way, the good transmission of the electrical signal may be ensured, and a radiation characteristic of the first antenna element may be ensured.

With reference to the first aspect, in some embodiments of the first aspect, a width of the gap formed between the first region and the second region is greater than or equal to 6 μm.

In an embodiment of this application, an extent to which a grid subunit of a second region affects the first antenna element 240 in a first region may be controlled by adjusting the width of the gap.

With reference to the first aspect, in some embodiments of the first aspect, the radiator component includes a first radiator, a second radiator, a third radiator, and a fourth radiator. The first radiator, the second radiator, the third radiator, and the fourth radiator are distributed in a 2×2 array, and the first radiator and the third radiator are disposed opposite to each other. The feed component includes a first feed line and a second feed line, one end of the first feed line is electrically connected to the first radiator and the second radiator separately, and one end of the second feed line is electrically connected to the second radiator and the third radiator separately.

With reference to the first aspect, in some embodiments of the first aspect, when the first feed line performs feeding, an electrical signal in the first radiator is coupled to the fourth radiator through the gap, and an electrical signal in the second radiator is coupled to the third radiator through the gap. When the second feed line performs feeding, the electrical signal in the second radiator is coupled to the first radiator through the gap, and an electrical signal in the third radiator is coupled to the fourth radiator through the gap.

In an embodiment of this application, for the first antenna element, the first feed unit feeds the first radiator and the second radiator through the first feed line and the first connector, the electrical signal in the first radiator may be coupled to the fourth radiator through the gap, the electrical signal in the second radiator may be coupled to the third radiator through the gap, and the first antenna element generates resonance in a first polarization manner. When the second feed unit feeds the second radiator and the third radiator through the second feed line and the second connector, the electrical signal in the second radiator may be coupled to the first radiator through the gap, the electrical signal in the third radiator may be coupled to the fourth radiator through the gap, and the first antenna element generates resonance in a second polarization manner. The first polarization manner may be tilting a polarized antenna at 45° to the left, and the second polarization manner may be tilting a polarized antenna at 45° to the right. This improves isolation between two feed channels of an antenna and may be applied to a multiple-input multiple-output antenna system.

With reference to the first aspect, in some embodiments of the first aspect, the display apparatus further includes a flexible printed circuit FPC. One end of the FPC is electrically connected to the first feed line and the second feed line, and the other end of the FPC is electrically connected to a feed unit of the electronic device. A wave-trap structure is disposed on the FPC, and the wave-trap structure includes a slot-type structure or a C-type structure.

In an embodiment of this application, the wave-trap structure may be used to improve isolation between the first feed line and the second feed line, and improve radiation performance of the first antenna element.

With reference to the first aspect, in some embodiments of the first aspect the first region further includes a second antenna element. An operating band of the first antenna element and the second antenna element includes a first band. A distance between the first antenna element and the second antenna element is greater than a half of a first wavelength, and the first wavelength is a wavelength corresponding to a center frequency of the first band In an embodiment of this application, the first region of the metal grid may include a plurality of antenna elements, and a quantity of the antenna elements may be adjusted according to an actual design requirement. This is not limited in this application.

With reference to the first aspect, in some embodiments of the first aspect, the first band is 24.25 GHZ to 29.5 GHZ, or 37.5 GHZ to 43.5 GHZ.

In an embodiment of this application, the first band may be 24.25 GHZ to 29.5 GHZ. Alternatively, the band may be another millimeter-wave band, for example, 37.5 GHZ to 43.5 GHz, or may be a higher band, for example, 50 GHz or 60 GHZ. This is not limited in this application, and may be adjusted according to an actual requirement.

With reference to the first aspect, in some embodiments of the first aspect, a width of a metal line that encloses the grid subunit is less than or equal to 2 μm.

In an embodiment of this application, the display apparatus may have an optical characteristic that transparence is high and the moire is few, to improve user experience.

With reference to the first aspect, in some embodiments of the first aspect, a thickness of a metal line that encloses the grid subunit is between 0.7 μm and 4 μm.

In an embodiment of this application, the thickness of the metal line that encloses the grid subunit is between 0.7 μm and 4 μm. In this way, impedance may be relatively low: to ensure that the antenna structure has good radiation performance.

According to a second aspect, an electronic device is provided, where the electronic device includes the display apparatus according to any embodiment of the first aspect.

DESCRIPTION OF EMBODIMENTS

The following describes technical solutions of this application with reference to accompanying drawings.

It should be understood that, in this application. "electrical connection" may be understood that components contact physically and conduct electrically. It may also be understood as a form in which different components in a line structure are connected through physical lines that can transmit an electrical signal, such as a printed circuit board (PCB) copper foil or a conducting wire. A "communication connection" may refer to an electrical signal transmission, including a wireless communication connection and a wired communication connection. The wireless communication connection does not require a physical medium and does not belong to a connection relationship that defines a construction of a product. Both "connection" and "interconnection" may refer to a mechanical connection relationship or a physical connection relationship. For example, A-B connection or A-B interconnection may refer to that a fastened component (such as a screw; a bolt, a rivet, etc.) exists between A and B: or A and B are in contact with each other and are difficult to be separated.

Figure 1:
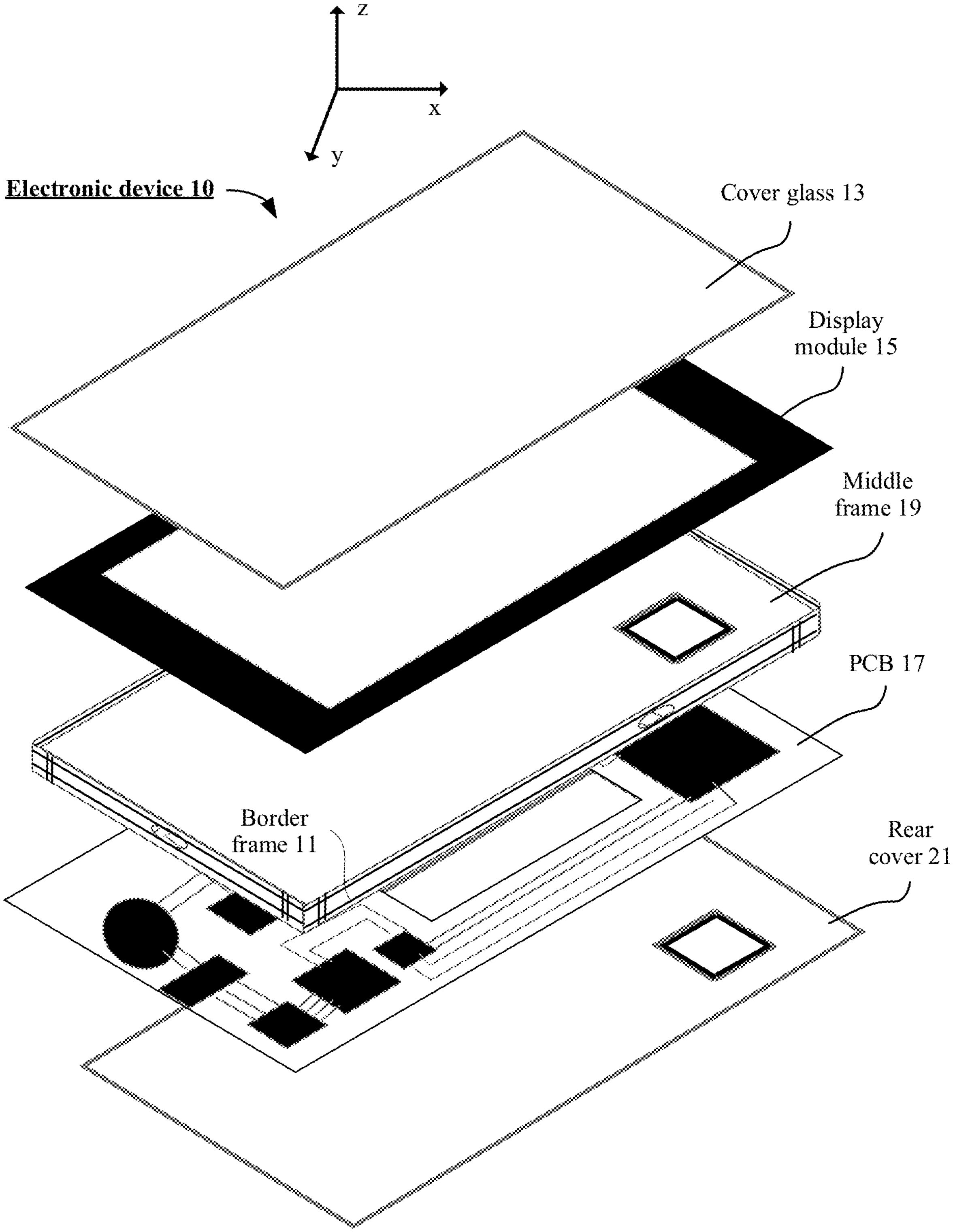
FIG. 1 is a schematic diagram of an electronic device according to an embodiment of this application.

The technical solutions provided in this application are applicable to an electronic device that uses one or more of the following communication technologies: a Bluetooth (BT) communication technology, a global positioning system (GPS) communication technology, a wireless fidelity (Wi-Fi) communication technology, a global system for mobile communication (GSM) communication technology, a wideband code division multiple access (WCDMA) communication technology, a long term evolution (LTE) communication technology, a 5G communication technology, and other communication technologies in future. The electronic device in embodiments of this application may be a mobile phone, a tablet computer, a laptop computer, a smart bracelet, a smart watch, a smart helmet, smart glasses, or the like. Alternatively, the electronic device may be a cellular phone, a cordless phone, a session initiation protocol (SIP) phone, a wireless local loop (WLL) station, a personal digital assistant (PDA), a handheld device with a wireless communication function, a computing device or another processing device connected to a wireless modem, a vehicle-mounted device, an electronic device in a 5G network, an electronic device in a future evolved public land mobile network (PLMN), or the like. This is not limited in this embodiment of this application. FIG. 1 shows an example of an electronic device according to this application. An example in which the electronic device is a mobile phone is used for description.

As shown in FIG. 1, an electronic device 10 may include a cover glass 13, a display module 15, a printed circuit board (PCB) 17, a middle frame (housing) 19, and a rear cover 21. It should be understood that, in some embodiments, the cover glass 13 may also be replaced with a cover plate made of another material, for example, a cover plate made of an ultra-thin glass material or a cover plate of a PET (polyethylene terephthalate) material.

The cover glass (CG) 13 may be disposed in close contact with the display module 15, and may be mainly configured to provide protection and dust prevention functions for the display module 15.

In an embodiment, the display module 15 may include a liquid crystal display panel, a light-emitting diode (LED) display panel, an organic light-emitting semiconductor (OLED) display panel, or the like. This is not limited in this application.

The printed circuit board PCB 17 may be a flame-resistant (FR-4) dielectric board, may be a Rogers dielectric board, or may be a hybrid dielectric board of Rogers and FR-4, or the like. Herein. FR-4 is a grade designation for a flame-retardant material, and the Rogers dielectric board is a high frequency board. A metal layer may be disposed on a side, close to the middle frame 19, of the printed circuit board PCB 17, and the metal layer may be formed by etching metal on a surface of the PCB 17. The metal layer may be used for grounding an electronic component carried on the printed circuit board PCB 17, to prevent an electric shock to a user or damage to a device. The metal layer may be referred to as a PCB floor. The metal layer is not limited to the PCB floor, and the electronic device 10 may also have another floor for grounding, for example, a metal middle frame.

The electronic device 10 may further include a battery (not shown in the figure). The battery may be disposed in the middle frame 19, and the PCB 17 may be divided into a main board and a sub-board by using the battery. The main board may be disposed between the middle frame 19 and an upper edge of the battery, and the sub-board may be disposed between the middle frame 19 and a lower edge of the battery.

The middle frame 19 is mainly used to support the entire device. The middle frame 19 may include a border frame 11. The border frame 11 may be made of a conductive material such as metal. The border frame 11 may extend around peripheries of the electronic device 10 and the display module 15. The border frame 11 may specifically encircle four sides of the display module 15, to help fasten the display module 15. In an implementation, the border frame 11 made of a metal material may be directly used as a metal border frame of the electronic device 10, to form an appearance of the metal border frame. This is applicable to a metal industrial design (ID). In another implementation, an outer surface of the border frame 11 may alternatively be a non-metal material, for example, a plastic border frame, to form an appearance of a non-metal border frame. This is applicable to a non-metal ID.

The rear cover 21 may be a rear cover made of a metal material, or may be a rear cover made of a non-conductive material, for example, a non-metal rear cover such as a glass rear cover, a plastic rear cover, or the like.

FIG. 1 shows merely an example of some components included in the electronic device 10. Actual shapes, actual sizes, and actual construction of these components are not limited to those shown FIG. 1.

With rapid development of wireless communication technologies, a millimeter-wave has an extremely wide bandwidth, and has advantages of good confidentiality and high transmission quality. Therefore, application of millimeter-wave bands is increasingly concerned. However, for an electronic device operating in a millimeter-wave band, to implement fast steering of a high-directivity antenna beam on a sphere, a highly complex phased array antenna beam control system is required. Due to a compact structure of the electronic device and limited use of physical space, a current antenna is mainly in a planar shape, to facilitate integration. For the electronic device operating in a millimeter-wave band, spherical coverage may be implemented through a plurality of phased array antennas. A simplest and direct method is to respectively arrange two millimeter-wave antennas on a front surface and a back surface (a screen is the front surface) of the electronic device, to implement the spherical coverage of an electromagnetic wave. However, actually, the front surface of the electronic device may be a high-resolution screen, that is, a light-emitting diode or a liquid crystal display module. A metal trace or another conductive layer (such as a metal oxide) in a module structure can prevent passage of the electromagnetic wave. An antenna arranged on the back surface of the electronic device may cover only space at a non-display surface. However, space at a display surface is affected by the display module, and it is difficult to propagate a signal to a side of the display module. A simplest and direct method is to respectively arrange two millimeter-wave antennas (or two millimeter-wave antenna arrays) on the front surface and the back surface (for example, a screen may be referred to as the front surface) of the electronic device, to implement the spherical coverage. However, actually, the front surface of the electronic device may be a high-resolution screen, that is, the light-emitting diode or the liquid crystal display module. The metal trace or the another conductive layer (such as the metal oxide) in the structure of the display module prevents passage of the electromagnetic wave. An electromagnetic wave transmitted by the antenna arranged on the back surface of the electronic device may cover only the space at the non-display plane. However, the space at the display surface is affected by the display module, and it is difficult to propagate a signal to the side of the display module. Therefore, for the electronic device operating in a millimeter-wave band, beam coverage is severely limited. In addition, a transverse propagation or a longitudinal propagation of the electromagnetic wave is also interfered by a hand of a user. This imposes a limitation on application of an antenna in the millimeter-wave band and a terahertz band. To resolve these problems, a concept of an optical invisible antenna on display (AOD) has been proposed recently. To be specific, a planar antenna is integrated into a visible region of the screen. This concept is easy to be implemented on a glass substrate. However, in an actual screen, impact of a structure such as a front cover glass, a polarizer, and a touch layer further needs to be considered.

Figure 2:
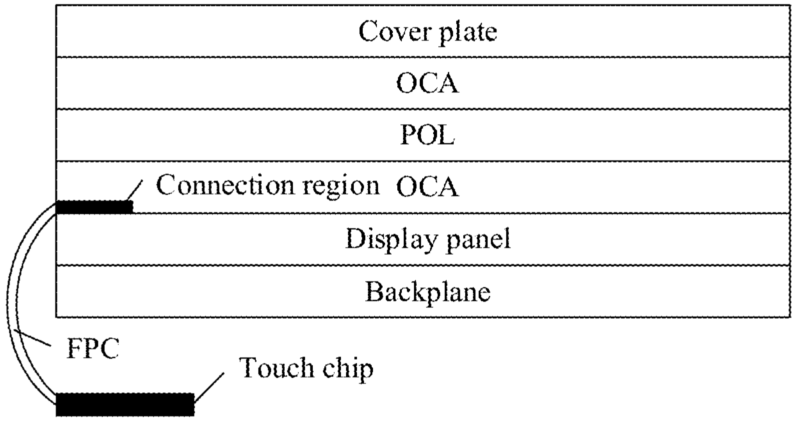
FIG. 2 is a schematic diagram of a structure of a display module in a conventional technology.

FIG. 2 is a schematic diagram of a structure of a display module (for example, a sectional view of the display module 15 on an XOZ plane in FIG. 1), and the display module 15 may be used in the device shown in FIG. 1.

As shown in FIG. 2, the display module may include a cover plate, a polarizer (POL), a display panel, and a backplane.

The cover plate, the POL, the display panel, and the backplane are sequentially disposed in a stacked manner. The POL may be connected to the cover plate and the display panel by using an optically clear adhesive (OCA). Alternatively, the POL may be connected to an OLED by using an adhesive layer (adhesive) provided on the POL. The backplane may be made of a metal material, and may be configured to prevent interference of an electronic component inside an electronic device to a screen. The display panel may be an OLED display panel, or may be a display panel of another type (for example, a liquid crystal display). For example, the display panel is the OLED. A touch sensor may be integrated into the OLED, and the OLED may be electrically connected to a touch chip in the electronic device in a connection region (for example, an upper surface of the display panel in FIG. 2) by using a flexible printed circuit (FPC). It should be understood that, in an actual electronic device, the display panel may further need to be electrically connected to another chip. FIG. 2 is merely used as an example, and this is not limited.

Embodiments of this application provide a display module and an electronic device. A transparent dielectric layer is added to the display module, metal is deposited on the transparent dielectric layer, to form a metal grid, and a part of the metal grid is used as a radiator of an antenna structure. After an antenna is integrated into the display module, through optimization of an optical design, the metal grid can meet a requirement for optical transmittance, display effect is not obviously affected, and user experience is not reduced. In addition, because an antenna structure is integrated into the display module, coverage space of a wireless signal is increased. This avoids occurrence of a signal blind region, so that the electronic device has a more reliable connection in a millimeter-wave band, to meet a communication requirement.

Figure 3:
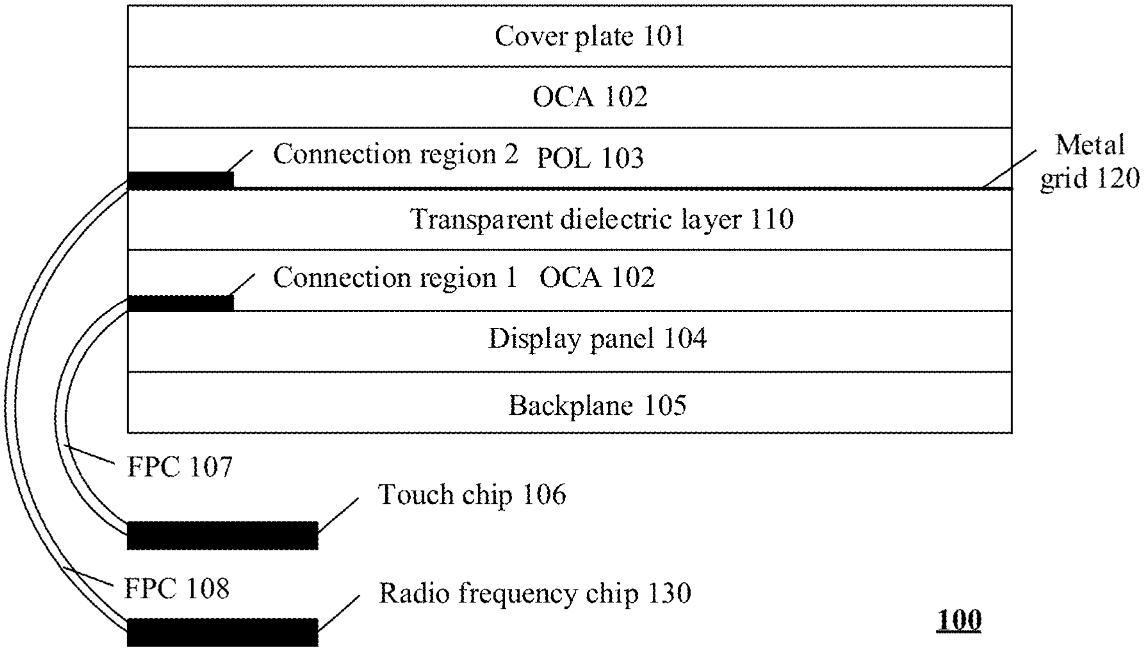
FIG. 3 is a schematic diagram of a structure of a display module 100 according to an embodiment of this application.

FIG. 3 is a schematic diagram of a structure of a display module 100 according to an embodiment of this application, and the display module 100 may be used in the device shown in FIG. 1.

FIG. 3 is a schematic diagram of a structure of a display module according to an embodiment of this application. The display module 100 may include a cover plate 101, a display panel 104, a transparent dielectric layer 110, and a metal grid 120.

The transparent dielectric layer 110 may be disposed between the cover plate 101 and the display panel 104. The metal grid 120 may be located on a surface of the transparent metal dielectric layer 110, or may be disposed, according to a design requirement, on a surface, close to the cover plate 101 or a surface, close to the display panel 104, of the transparent metal dielectric layer 110. A part of the metal grid 120 may be used as an AOD.

In an embodiment, the cover plate 101 may be made of a transparent material, to transmit light. In some embodiments, the cover plate 101 may be made of ultra-thin glass, to improve overall mechanical strength of the display module. Alternatively, in some embodiments, the cover plate 101 may also be configured to prevent dust. Further, the cover plate 101 may be a cover glass.

It should be understood that, a difference between the display module integrated with the AOD in FIG. 3 and the display module in FIG. 2 lies in that the transparent dielectric layer 110 and the metal grid 120 are added on a basis of the display module shown in FIG. 2. The transparent dielectric layer 110 may be used as a carrier of the metal grid. Because the transparent dielectric layer 110 and the metal grid 120 are added to the display module 100, while a requirement for optical transmittance is met and display effect of a display is ensured, coverage space of a wireless signal is increased. This avoids occurrence of a signal blind region, so that the electronic device has a more reliable connection in a millimeter-wave band, to meet a communication requirement.

In an embodiment, the transparent dielectric layer 110 may be a cyclo olefin polymer (COP), a transparent colorless polyimide (CPI) film, a polyethylene terephthalate (PET) resin, or another medium having a high transparency characteristic (transmittance ≥ 90%). This is not limited in this application. The transparent dielectric layer 110 may be connected to the cover plate 101 by using an OCA 102. A medium of the transparent dielectric layer 110 may have a specific mechanical strength and flexibility, to meet a requirement for a machining process. A dielectric constant of the medium of the transparent dielectric layer 110 may be between 2 and 4, to meet a radiation characteristic of an antenna.

In an embodiment, a metal material forming the metal grid 120 may be a metal alloy, a metal oxide, or another conductive material. This is not limited in this application.

In an embodiment, the metal grid 120 may cover a surface of the transparent dielectric layer 110. A user does not have a visual difference in use because no metal grid 120 is disposed in some regions. This may improve user experience.

In an embodiment, the display module 100 may further include a polarizer POL 103. The POL 103 may be disposed between the cover plate 101 and the transparent dielectric layer 110, and is connected to the cover plate 101 by using the OCA 102. The POL 103 may filter reflected light and increase imaging contrast, to effectively improve saturation of colors, and improve a definition of an image.

In an embodiment, the display module 100 may further include a backplane 105. The backplane 105 may be disposed on a side, away from the cover plate 101, of the OLED 104, to prevent interference to the OLED 104 when an electronic component in the electronic device operates.

In an embodiment, the display module 100 may include an FPC 107. One end of the FPC 107 may be electrically connected to the OLED 104 in a connection region 1, and the other end is electrically connected to a touch chip 106 in the electronic device, to implement signal transmission between the OLED 104 and the touch chip 106.

In an embodiment, the display module 100 may include an FPC 108. One end of the FPC 108 may be electrically connected to the metal grid 120 in a connection region 2, and the other end is electrically connected to or coupled to a radio frequency chip 130 in the electronic device. The radio frequency chip 130 may be used as a feed unit, to feed an electrical signal into an antenna structure in the metal grid 120. It should be understood that, the radio frequency chip 130 may be a chip in a radio frequency front end in the electronic device, or may be a device in a radio frequency circuit, for example, a device such as a power amplifier (PA), a low noise amplifier (LNA), or a surface acoustic wave (SAW).

Figure 4:
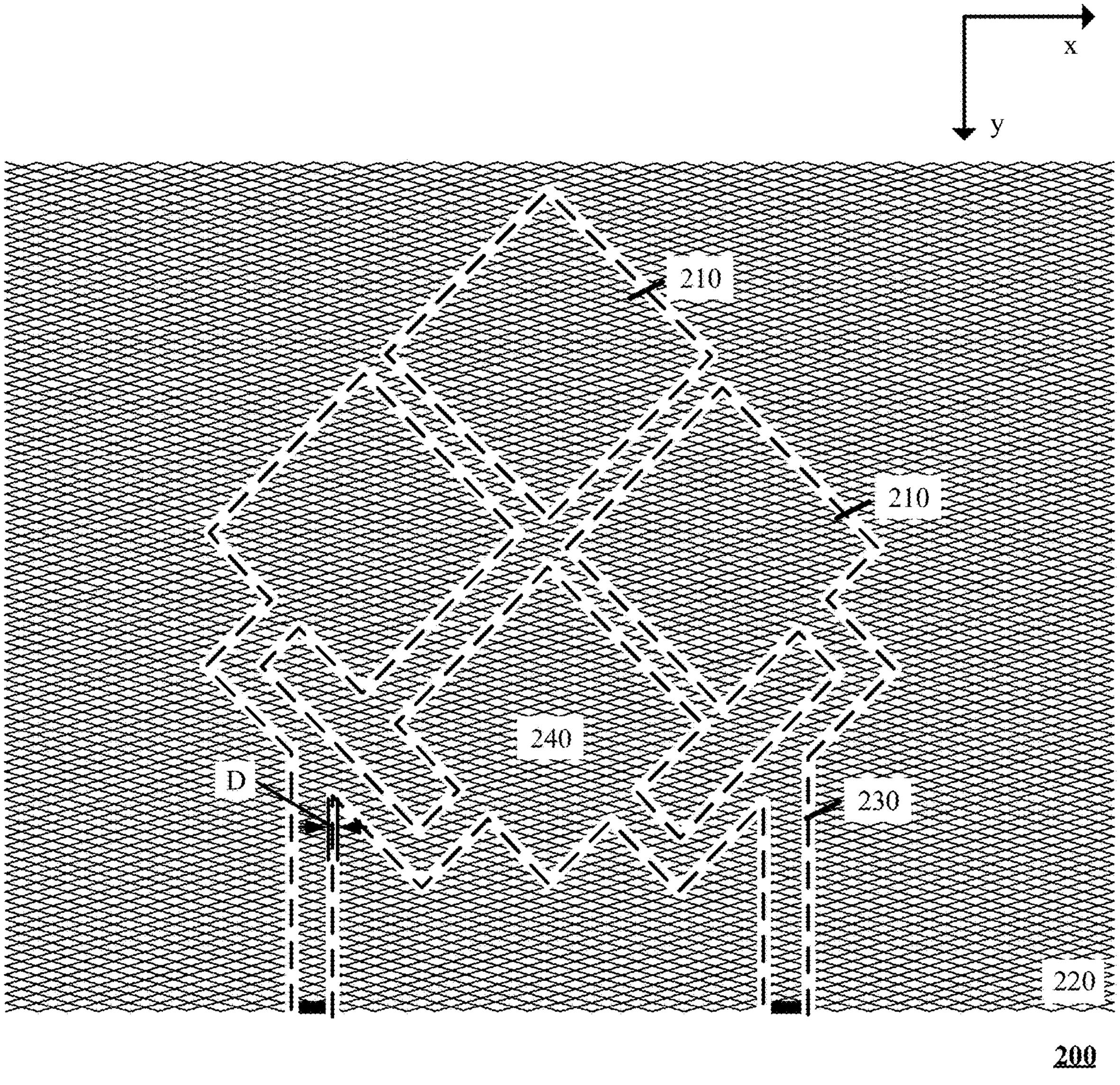
FIG. 4 is a schematic diagram of a structure of a metal grid 200 according to an embodiment of this application.

FIG. 4 is a schematic diagram of a structure of a metal grid 200 according to an embodiment of this application (for example, a sectional view of the metal grid 120 on an XOY plane in FIG. 3).

As shown in FIG. 4, the metal grid 200 includes a first region 210 and a second region 220.

A gap 230 is formed between the first region 210 and the second region 220. In other words, the metal grid 200 is divided into the first region 210 and the second region 220 through the gap 230. The first region 210 may include a first antenna element 240).

Figure 5:
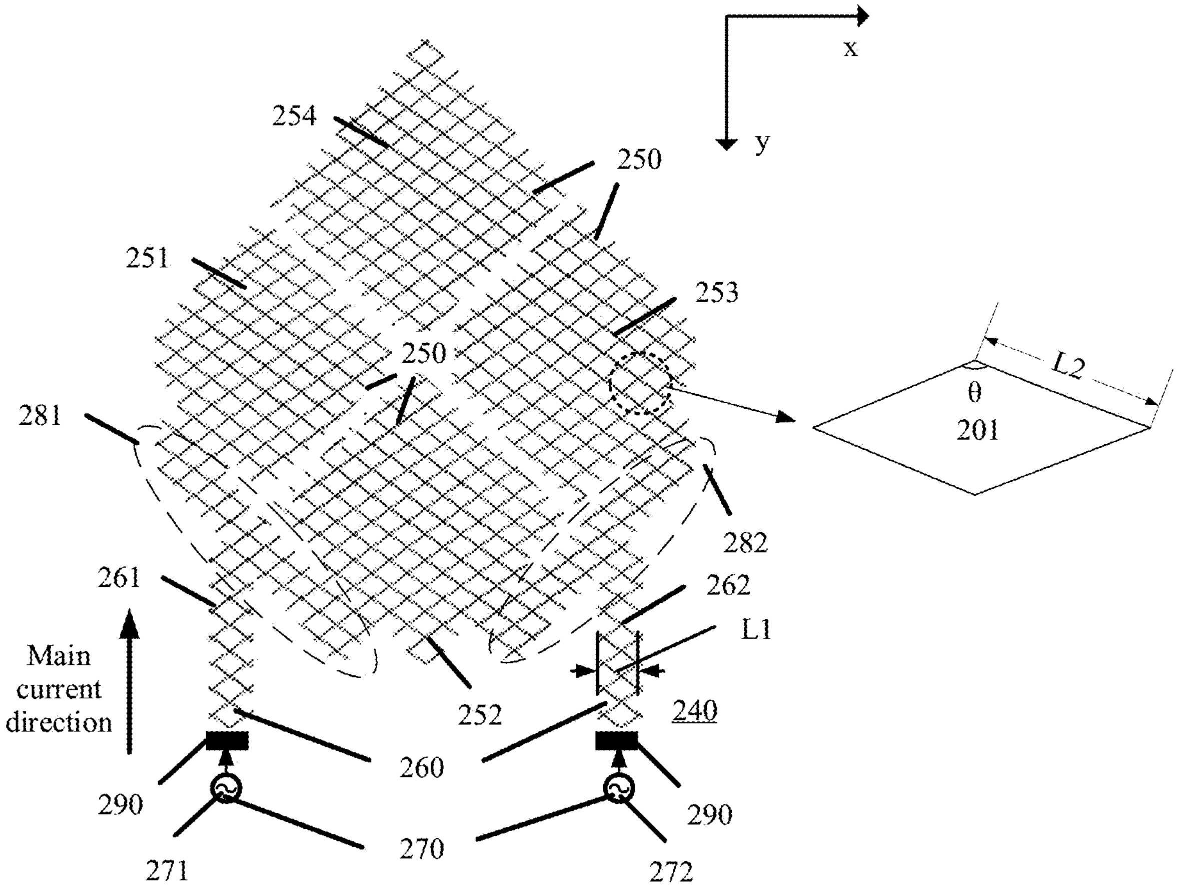
FIG. 5 is a schematic diagram of a structure of a first antenna structure 240 according to an embodiment of this application.

As shown in FIG. 5, a metal grid includes a plurality of grid subunits 201. The plurality of grid subunits 201 may be periodically arranged. The first antenna element 240 is an antenna element in a shape of a metal grid. The first antenna element 240 includes a radiation component 250 and a feed component 260. One end of the feed component 260 is electrically connected to the radiation component 250. A width of any position of the first antenna element 240 is greater than or equal to a width of the grid subunit 201. This may be understood as that a width of the radiation component 250 or a width of the feed component 260 is greater than or equal to the width of the grid subunit. The width of the radiation component 250 may be considered as a distance between two opposite edges of any component in the radiation component 250, or may be considered as a distance of any component in the radiation component 250 in a direction (for example, an X direction or a Y direction).

It should be understood that, in this embodiment of this application, an example in which the first antenna element 240 is a patch antenna is used for description. Based on actual application, the first antenna element may alternatively be another type of single-layer planar antenna, for example, a dipole antenna, an inverted F antenna, or the like. This is not limited in this application.

In an embodiment, the grid subunit 201 may be a triangle, a square, a rectangle, a hexagon, an octagon, a "Φ" shape, or a "zigzag" shape. This is not limited in this application. For brevity of description, an example in which the grid subunit 201 is rhombic is merely used in this application. As shown in FIG. 4, adjustment may be performed according to a requirement for an actual design or production.

In an embodiment, as shown in FIG. 4, a width D of a gap 230 formed between the first region 210 and the second region 220 is greater than or equal to 6 μm. An extent to which a grid subunit of the second region 230 affects the first antenna element 240 in a first region 230 may be controlled by adjusting the width of the gap 230.

In an embodiment, as shown in FIG. 5, the feed component 260 may be electrically connected to a feed unit 270 in an electronic device and is configured to feed the radiation component 250. It should be understood that the feed unit 270 may be a radio frequency channel in a radio frequency chip inside the electronic device.

In an embodiment, as shown in FIG. 5, a width L1 of the feed component 260 may be greater than or equal to a width L3 of the grid subunit 201, to ensure good transmission of an electrical signal. To be specific, the width L1 of the feed component 260 satisfies the following formula:

$$L1 \geq 2 \times L2 \times \sin\frac{\theta}{2},$$

where

L2 represents a side length of the grid subunit, and 0 represents an included angle in the grid subunit 201 in a current direction of the feed component. The current direction on the feed component may be considered as a main current direction, namely, a direction in which a plurality of current vectors are composed. For example, when a current is transmitted along an edge of the grid subunit 201, a main current direction of the current is a Y direction. θ may be an obtuse angle, an acute angle, or a right angle. The main current direction may be understood as a direction of more than 50% of current intensity on the feed component.

In an embodiment, that the feed component 260 includes at least one grid subunit 201 in the width L1 direction (for example, the X direction) may be understood as that the feed component 260 includes at least one complete grid subunit 201 in the width L1 direction, and the at least one complete grid subunit 201 is not split by a gap. Compared with a split grid subunit 201, good transmission of the electrical signal can be ensured, to ensure a radiation characteristic of the first antenna element 240).

In an embodiment, the radiator component 250) may include a first radiator 251, a second radiator 252, a third radiator 253, and a fourth radiator 254. The feed component 260 includes a first feed line 261 and a second feed line 262. The first radiator 251, the second radiator 252, the third radiator 253, and the fourth radiator 254 are distributed in a 2×2 array. The first radiator 251 and the third radiator 253 are disposed opposite to each other (not adjacent to each other) in the X direction, and the second radiator 252 and the fourth radiator 254 are disposed opposite to each other in the Y direction. One end of the first feed line 261 is electrically connected to the first radiator 251 and the second radiator 252, and one end of the second feed line 262 is electrically connected to the second radiator 252 and the third radiator 253.

In an embodiment, the first antenna element 240 may include a first connector 281 and a second connector 282. The first connector 281 and the second connector 282 each may be a one-to-two power divider with three ports, including one input port and two output ports. After an electrical signal is fed into the input port, the two output ports may obtain electrical signals of which amplitudes and phases are the same, and the amplitude of the electrical signal is a half of an amplitude of the fed electrical signal. One end of the first feed line 261 may be electrically connected to an input port of the first connector 281 and is configured to feed power to the electrical signal into the first antenna element 240. Two output ports of the first connector 281 may be electrically connected to the first radiator 251 and the second radiator 252 respectively, to transmit the electrical signals to the first radiator 251 and the second radiator 252 respectively. One end of the second feed line 262 may be electrically connected to an input port of the second connector 282 and is configured to feed power to the electrical signal into the first antenna element 240. Two output ports of the second connector 282 may be electrically connected to the second radiator 252 and the third radiator 253 respectively, to transmit the electrical signals to the second radiator 252 and the third radiator 253 respectively.

It should be understood that, for the first antenna element 240, a first feed unit 271 feeds the first radiator 251 and the second radiator 252 through the first feed line 261 and the first connector 281, and the antenna element may generate a first resonance. An electrical signal in the first radiator 251 may be coupled to the third radiator 253 through a gap, an electrical signal in the second radiator 252 may be coupled to the fourth radiator 254 through a gap, and the antenna element may generate a second resonance. In this case, polarization manners for the first resonance and the second resonance are the same, that is, a first polarization manner. Because the first antenna element 240) may generate two resonances when the first feed unit performs feeding, an operating bandwidth of the first antenna element 240 is expanded.

Correspondingly, when a second feed unit 272 feeds the second radiator 252 and the third radiator 253 through the second feed line 262 and the second connector 282, the antenna element may generate a third resonance. The electrical signal in the second radiator 252 may be coupled to the first radiator 251 through a gap, an electrical signal in the third radiator 253 may be coupled to the fourth radiator 254 through a gap, and the antenna element may generate a fourth resonance. In this case, polarization manners for the third resonance and the fourth resonance are the same, that is, a second polarization manner. Because the first antenna element 240) may generate the two resonances when the second feed unit performs feeding, the operating bandwidth of the first antenna element 240 is expanded.

The first polarization manner may be tilting a polarized antenna at 45° to the left, and the second polarization manner may be tilting a polarized antenna at 45° to the right, which may be used in a multiple-input multiple-output (MIMO) antenna system. It should be understood that, tilting a polarized antenna at 45° to the left and tilting a polarized antenna at 45° to the right may be considered that an angle between a polarization direction of the polarized antenna and an X coordinate axis is −45° and +45° respectively. In the first antenna element 240, a fed electrical signal is coupled through a gap, and two resonances may be respectively generated in two corresponding polarization manners, to improve performance and increase a bandwidth of the MIMO antenna system.

In an embodiment, the display module may further include an FPC 290. One end of the FPC 290 is electrically connected to a feed line (for example, the first feed line 261 or the second feed line 262), and the other end of the FPC is electrically connected to the feed unit 270 of the electronic device. The FPC 290 is configured to feed an electrical signal provided by the feed unit 270 into the first feed line 261 and the second feed line 262. It should be understood that the FPC includes a plurality of different current paths. An electrical signal in the feed unit 270 may be fed into the first feed line 261 and the second feed line 262 through different current paths. For example, the first feed line 261 may feed an electrical signal provided by the first feed unit, and the second feed line 262 may feed an electrical signal provided by the second feed unit. The first feed unit and the second feed unit may be considered as transmitting units, and the first feed unit and the second feed unit are different radio frequency channels in a same radio frequency chip in the electronic device. In this case, adjustment may be performed according to an actual requirement.

In an embodiment, an operating band of the first antenna element 240 may include a first band. The first band may be 24.25 GHZ to 29.5 GHZ. Alternatively, the band may be another millimeter-wave band, for example, 37.5 GHZ to 43.5 GHZ, or may be a higher band, for example, 50 GHz or 60 GHZ. This is not limited in this application, and may be adjusted according to an actual requirement.

Figure 6:
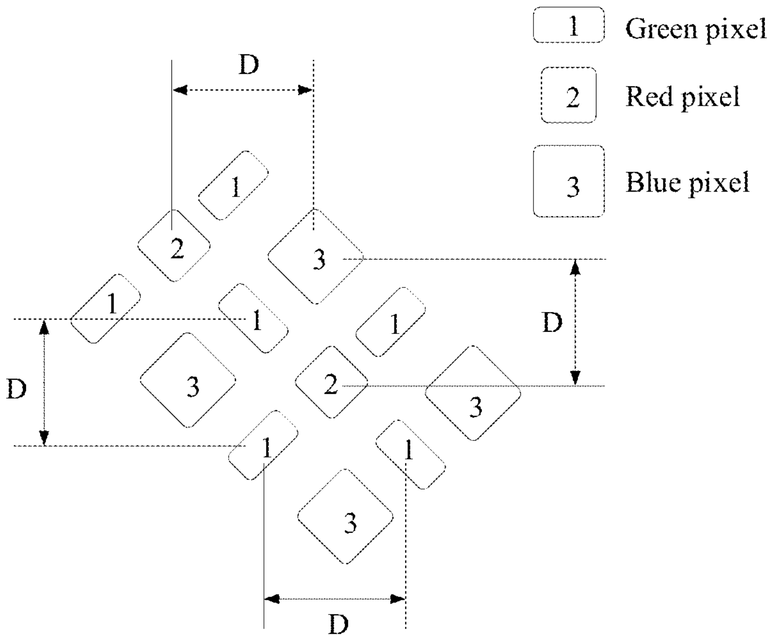
FIG. 6 is a schematic diagram of arrangement of pixel points on an OLED according to an embodiment of this application.
Figure 7:
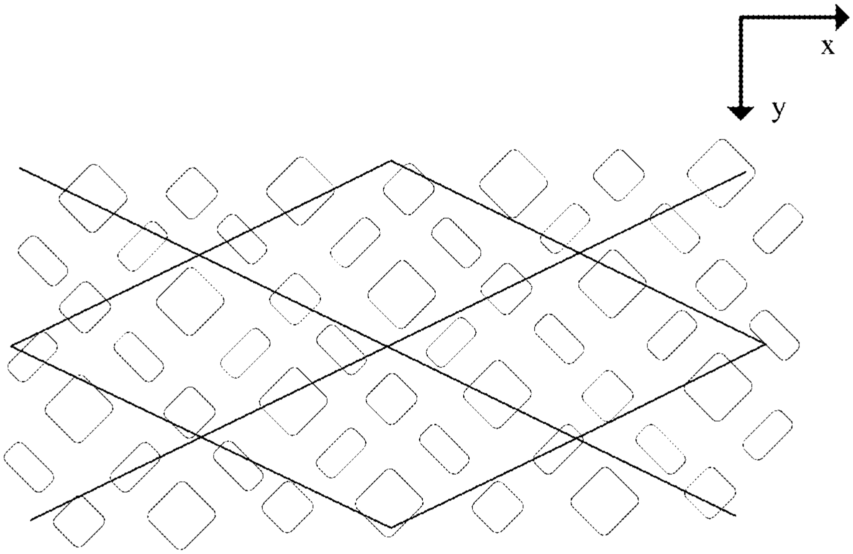
FIG. 7 is a schematic diagram of a position of a metal grid attached to an OLED relative to a pixel point according to an embodiment of this application.

FIG. 6 and FIG. 7 are schematic diagrams of a structure that a display panel is an OLED according to an embodiment of this application. FIG. 6 is a schematic diagram of arrangement of pixel points on an OLED according to an embodiment of this application. FIG. 7 is a schematic diagram of a position of a metal grid attached to an OLED relative to a pixel point according to an embodiment of this application.

As shown in FIG. 6, the pixel points on the OLED provided in this embodiment of this application are in a diamond arrangement, which is merely used as an example. It should be understood that, sizes of pixel points on different display panels may be different, and sizes of different colors of pixel points on a same display panel may also be different. This is not limited in this application. In addition, for brevity of description, this embodiment of this application is described only by using an example in which a distance D between the pixel points is 100 μm. The distance D between the pixel points may be considered as a straight-line distance between points that are closest to each other on adjacent pixels. The foregoing content is not limited in this application, and may be adjusted based on an actual design.

FIG. 7 shows a position of the metal grid attached to the OLED relative to a pixel point. It should be understood that, in a process of manufacturing a display, because fitting precision of components in the display is far greater than 2 μm, when a user uses the electronic device, a user is not affected by a moire caused by an added metal grid in the display, and use experience of the user is not reduced. Therefore, for the metal grid, an optical characteristic that transparence is high and the moire is few is to be ensured while an electrical characteristic of an antenna structure is ensured.

When the user uses the electronic device, there is the moire on the display. This affects user experience. The moire is a high-frequency interference stripe appearing on a display panel, and is a high-frequency irregular stripe that makes a picture appearing in a color. When the distance D between the pixel points on the display panel does not match a side length, a width, or the like of the grid subunit disposed above the display, the grid subunit affects imaging at the pixel points, thereby generating the moire. This reduces user experience.

In an embodiment, a width of a metal line of a grid subunit that encloses the metal grid may be less than or equal to 2 μm, to ensure the optical characteristic that transparence is high and the moire is few: This improves user experience.

In an embodiment, a thickness of the metal line of a grid subunit that encloses the metal grid may be between 0.7 μm and 4 μm, to maintain a relatively low impedance. This ensures a good radiation characteristic of the antenna structure. It should be understood that, the thickness of the metal line may be considered as that the grid subunit is located in a z direction.

Figure 8:
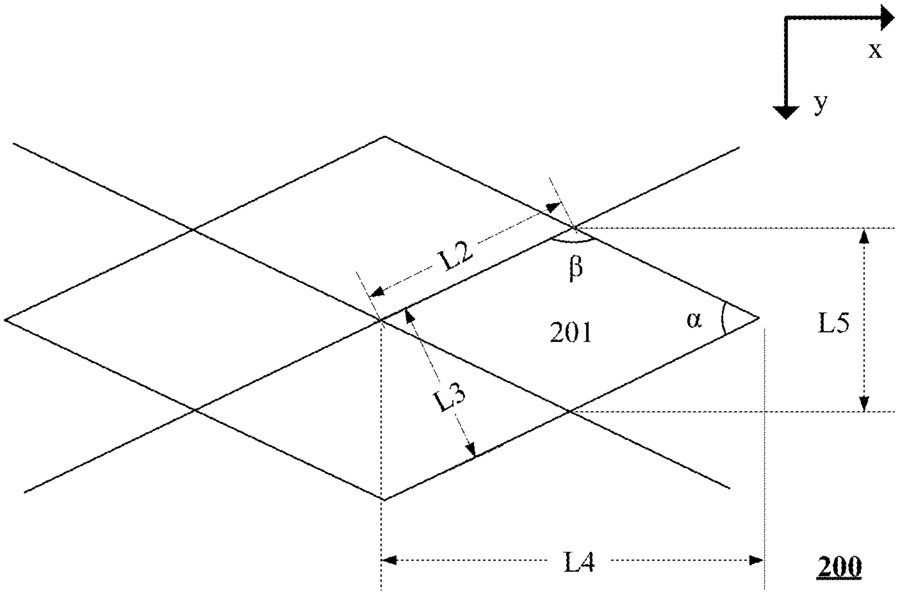
FIG. 8 is a schematic diagram of a structure of a grid subunit according to an embodiment of this application.

In an embodiment, as shown in FIG. 8, a side length L2 of the grid subunit 201 may be one time (2×D) more than the distance D between the pixel points shown in FIG. 6, to ensure that there is no obvious moire. For example, if the distance D between the pixel points is 100 μm, the side length L2 of the grid subunit 201 may be approximately 200 μm.

In an embodiment, an acute angle α in the grid subunit 201 may be between 45° and 90°, and correspondingly, an obtuse angle β may be between 90° and 135°, to ensure good visual effect for a user, and improve user experience. A distance L3 between metal lines of the grid subunits that enclose the metal grid may be determined based on an angle in the grid subunit 201. For example, the side length L2 of the grid subunit 201 may be 200 μm, and the acute angle α in the grid subunit 201 is 67°. In this case, the distance L3 between metal lines is 184.1 μm. Correspondingly, a width of the grid subunit 201 may also be determined based on an angle of the grid subunit 201. For example, if the side length L2 of the grid subunit 201 is 200 μm, a width L4 of the grid subunit 201 corresponding to the obtuse angle β may be between 400 μm and 450 μm, and a width L5 of the grid subunit 201 corresponding to the acute angle α may be between 250 μm and 300 μm.

In an embodiment, the width of the grid subunit 201 (for example, the width L4 of the grid subunit 201 corresponding to the obtuse angle β and the width L5 of the grid subunit 201 corresponding to the acute angle α in FIG. 8) may be less than 500 μm. In this way, impedance of a grid subunit 201 forming the first antenna element 240 may be relatively low: Therefore, the first antenna element 240 obtains high enough antenna radiation efficiency.

Figure 9:
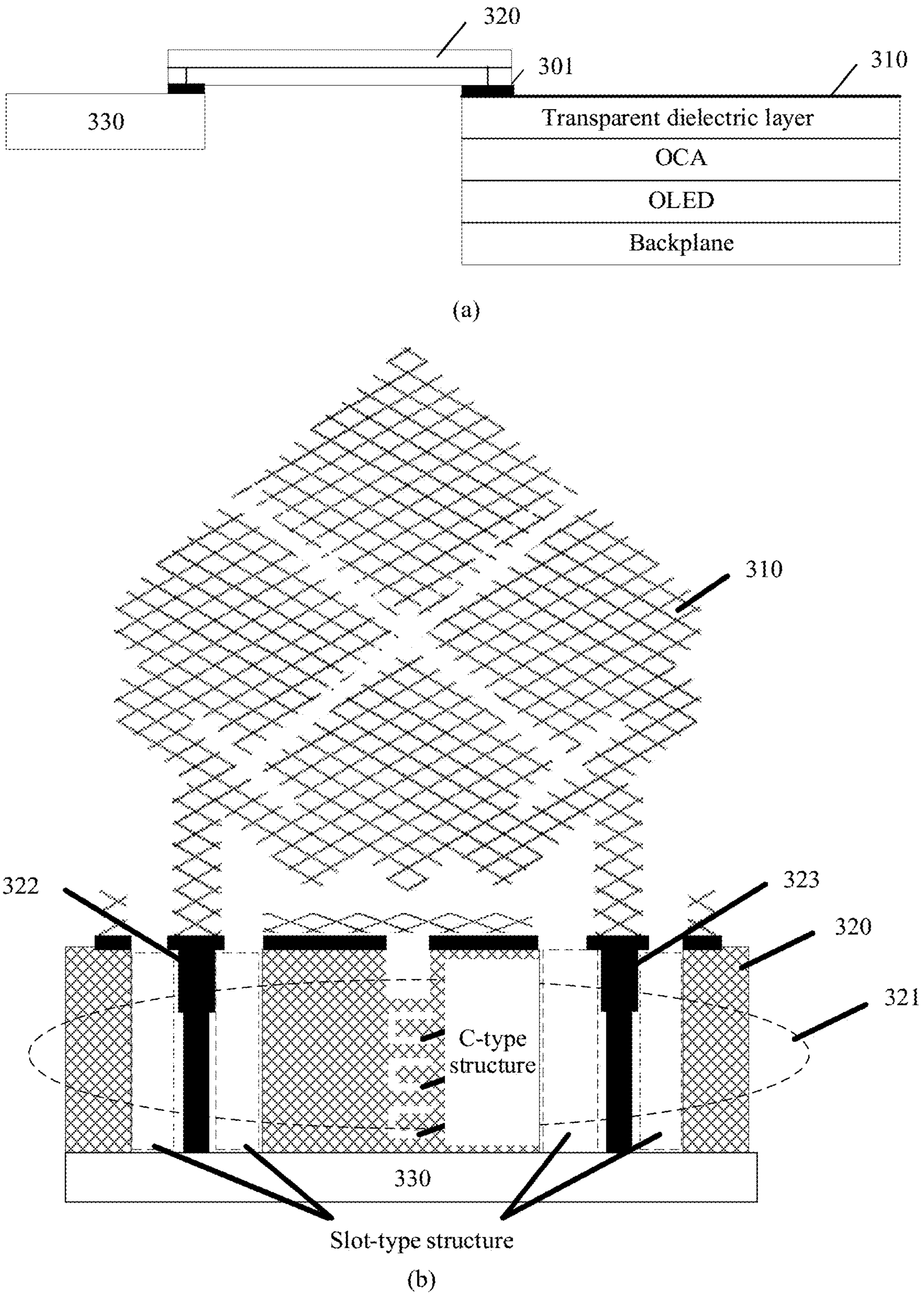
FIG. 9 is a schematic diagram of a structure of an FPC according to an embodiment of this application.

FIG. 9 is a schematic diagram of a structure of an FPC according to an embodiment of this application.

As shown in (a) in FIG. 9, a display module may include an FPC 320. One end of the FPC 320 may be electrically connected to a first antenna element 310 in a connection region 301, and the other end may be electrically connected to a radio frequency chip 330 in an electronic device. The FPC 320 may be configured to transmit, to the first antenna element 310, an electrical signal provided by the radio frequency chip 330 in the electronic device.

In an embodiment, to reduce electromagnetic interference, a strip line solution may be applied to a signal transmission part of the FPC 320. A flexible dielectric layer is disposed on both sides of a signal transmission line. At both ends of the signal transmission line, the signal transmission line is electrically connected to the radio frequency chip 330 or the first antenna element 310 by using a metal via hole.

In an embodiment, to reduce a dielectric loss, a dielectric layer in the FPC 320 may use a material having a low loss, for example, a material such as polyimide (PI), liquid crystal polymer (LCP), or the like.

In an embodiment, because an electrical signal transmitted in the FPC 320 is a high-frequency signal, an area of an effective contact region between the FPC 320 and the first antenna element 310 in the connection region 301 affects transmission quality of the electrical signal. To increase the effective contact area in the connection region 301, a binding glue with a relatively high metal particle content and density, for example, an anisotropic conductive film (ACF). In addition, an optimal diameter and optimal density of a metal particle in the binding glue, and an optimal bonding temperature and an optimal bonding pressure may be obtained through process verification or according to a design requirement. This is not limited in this application.

In an embodiment, a width of a transmission line for transmitting the electrical signal on the FPC may be changed. Alternatively, a matching circuit may be serially connected to the transmission line, to perform impedance conversion, and implement matching with the first antenna element 310.

In an embodiment, as shown in (b) in FIG. 9, a wave-trap unit 321 is disposed on the FPC 320. The wave-trap structure 321 may be used to improve isolation between a first feed line and a second feed line, to improve radiation performance of the first antenna element 310. For example, the wave-trap structure 321 may use a slot structure. For example, a slot is opened on two sides of the transmission line 322 and the transmission line 323 that are in the FPC and that are connected to the first feed line and the second feed line of the first antenna structure 310, and metals on two sides of the slot are grounded (electrically connected to a metal layer in the electronic device), to improve isolation between the first feed line and the second feed line.

In an embodiment, as shown in (b) in FIG. 9, the wave-trap structure 321 may further include a C-type structure, to further improve the isolation between the first feed line and the second feed line.

Figure 10:
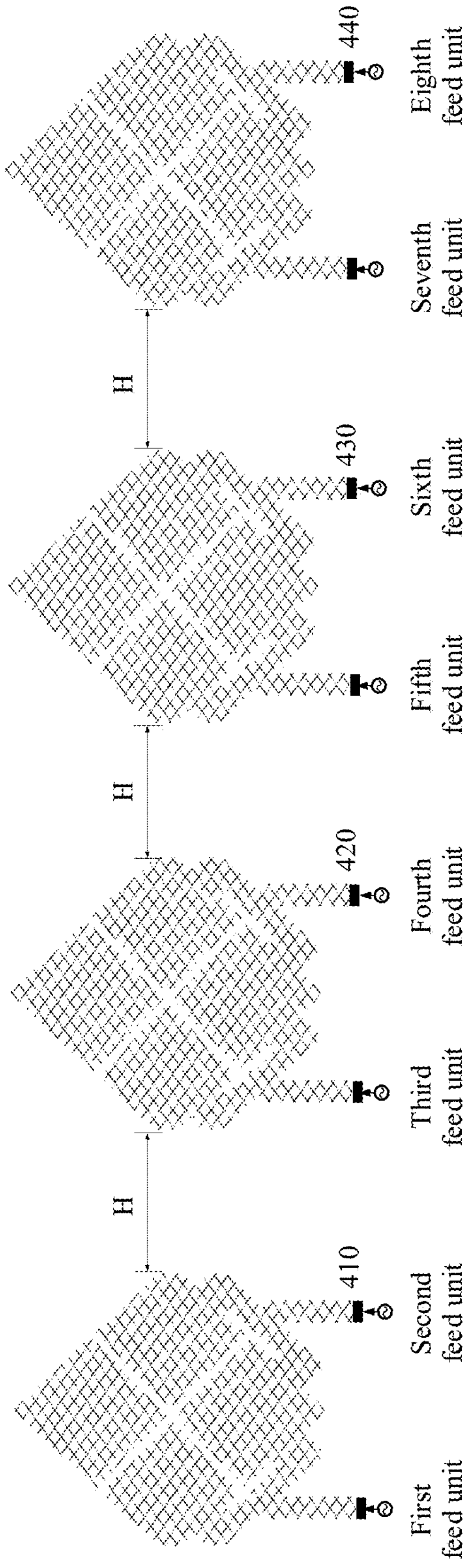
FIG. 10 is a schematic diagram of a structure of an antenna array according to an embodiment of this application.

FIG. 10 is a schematic diagram of a structure of an antenna array according to an embodiment of this application.

As shown in FIG. 10, a first region of a metal grid may include a first antenna element 410, a second antenna element 420, a third antenna element 430), and a fourth antenna element 440. Operating bands of the first antenna element 410, the second antenna element 420, the third antenna element 430, and the fourth antenna element 440 may all include a first band. The first antenna element 410, the second antenna element 420, the third antenna element 430, and the fourth antenna element 440 may form an antenna array, to improve a capability of signal transmission on the first band. To ensure good isolation between antenna elements, distances H among the first antenna element 410, the second antenna element 420, the third antenna element 430, and the fourth antenna element 440 may be greater than half of a first wavelength. The first wavelength is a wavelength corresponding to a frequency in the first band. The first wavelength may be understood as a wavelength corresponding to a center frequency of the first band, or a wavelength corresponding to a resonance point generated by any one of the first antenna element 410, the second antenna element 420, the third antenna element 430, and the fourth antenna element 440. This is not limited in this application.

It should be understood that the first region of the metal grid may include a plurality of antenna elements, and a quantity of the antenna elements may be adjusted according to an actual design requirement. This is not limited in this application.

In an embodiment, the first band may be a millimeter-wave band. The first band is 24.25 GHz to 29.5 GHZ.

Figure 11:
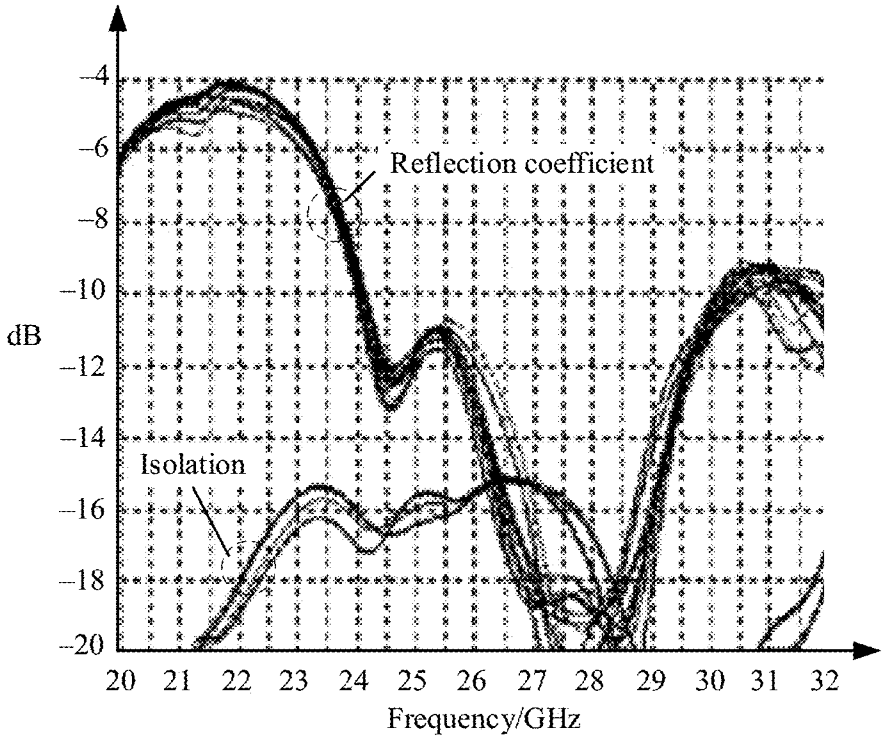
FIG. 11 is a diagram of an S parameter of the antenna array shown in FIG. 10.
Figure 12:
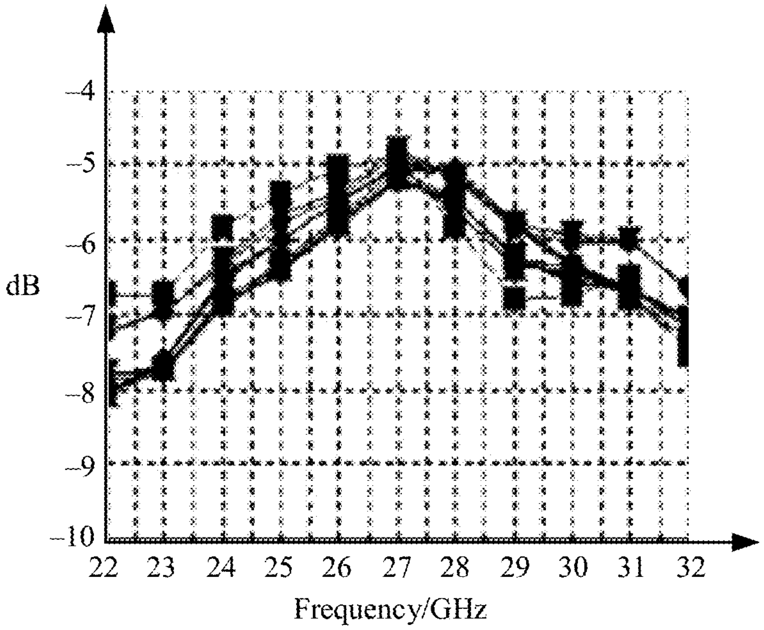
FIG. 12 is a diagram of a simulation result of system efficiency of the antenna array shown in FIG. 10.
Figure 13:
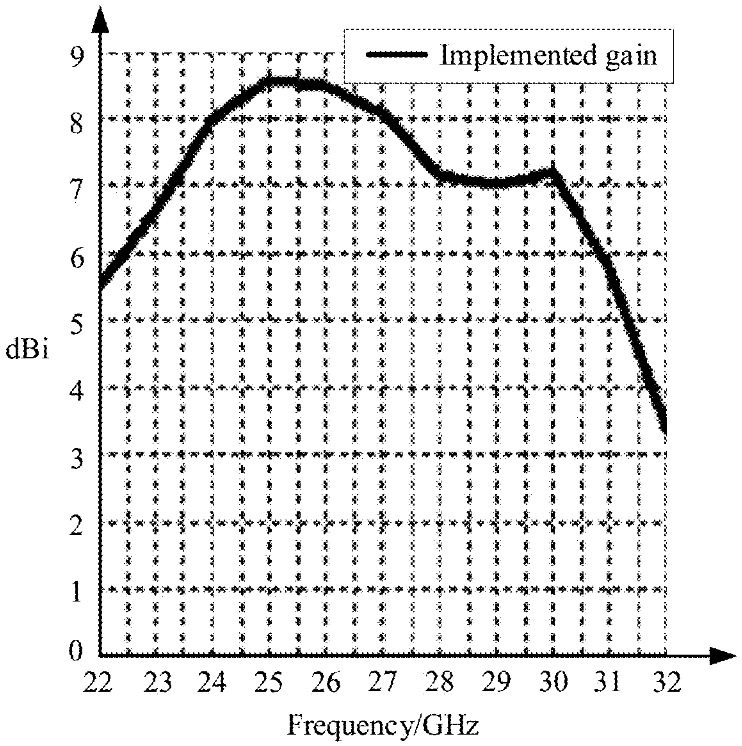
FIG. 13 is a diagram of a simulation result of an implemented gain of the antenna array shown in FIG. 10.

FIG. 11 to FIG. 13 are diagrams of simulation results of the antenna array shown in FIG. 10. FIG. 11 is a diagram of an S parameter of the antenna array shown in FIG. 10. FIG. 12 is a diagram of a simulation result of system efficiency (total efficiency) of the antenna array shown in FIG. 10. FIG. 13 is a diagram of a simulation result of an implemented gain of the antenna array shown in FIG. 10.

As shown in FIG. 11, in a first band (24.25 GHZ to 29.5 GHZ), when each antenna element in the antenna array performs feeding in two feed units that are corresponding to the antenna element at the same time (for example, performs feeding through a same feed port), a reflection coefficient (S11) corresponding to each feed unit is less than −10 dB, and isolation (S21) between antenna elements (for example, between the antenna element 410) and the antenna element 420) is less than −14 dB. To be specific, a resonant band generated by each antenna element in the antenna array may include the first band.

As shown in FIG. 12, in the first band (24.25 GHZ to 29.5 GHZ), system efficiency of the antenna element in the antenna array is more than −6.5 dB. Therefore, a radiation characteristic is good.

As shown in FIG. 13, in the first band (24.25 GHZ to 29.5 GHZ), an implemented gain of the antenna array at each frequency is more than 7 dBi. Therefore, the radiation characteristic is good.

Figure 14:
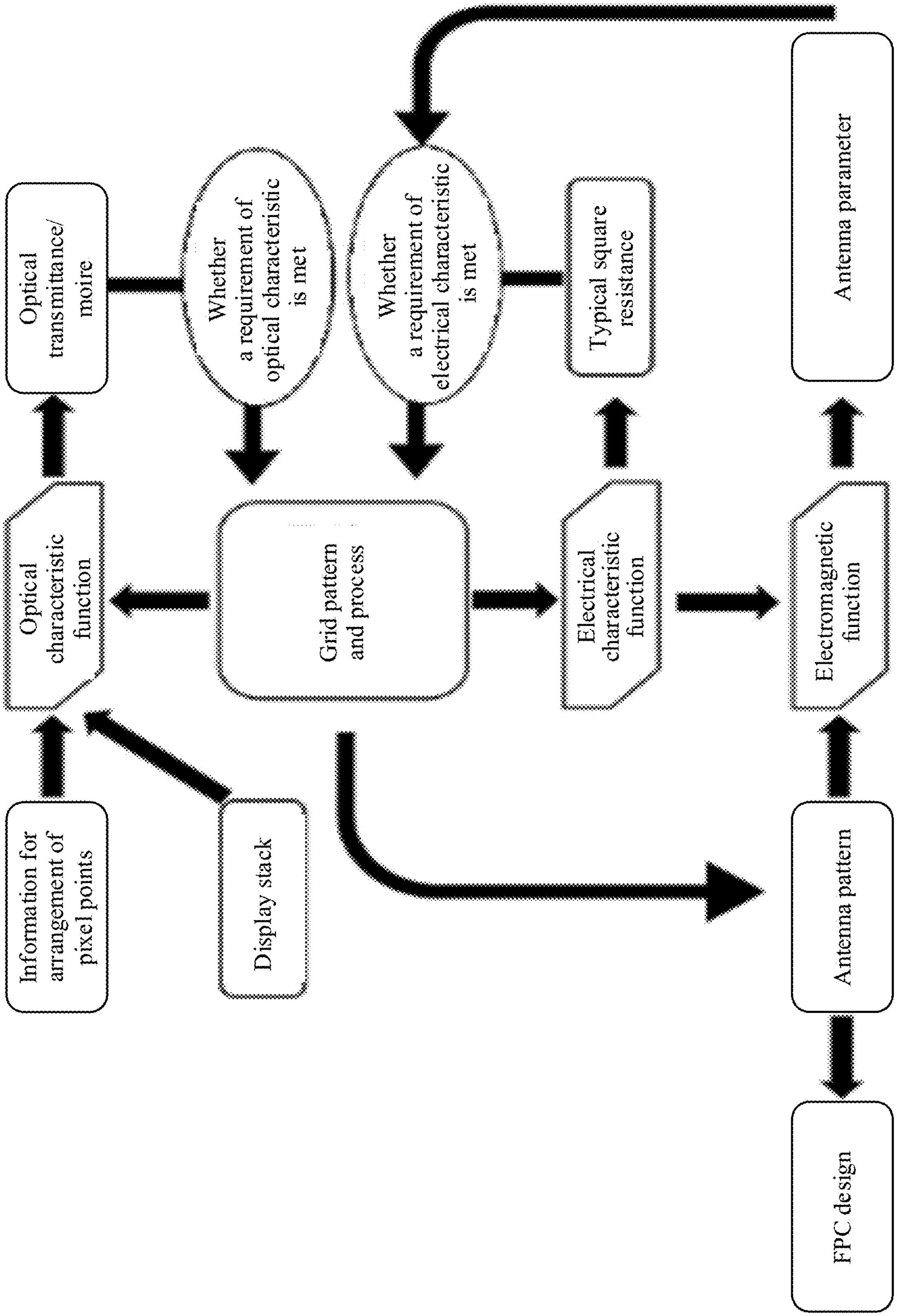
FIG. 14 is a schematic diagram of a design procedure of an AOD according to an embodiment of this application.

FIG. 14 is a schematic diagram of a design procedure of an AOD according to an embodiment of this application.

As shown in FIG. 14, for the AOD, both an optical characteristic of a display and an electrical characteristic of an antenna need to be met. Therefore, the AOD may be designed by the following method.

For the optical characteristic, it may be determined whether the optical characteristic is met based on arrangement of pixel points on a display panel, a stacked component, and a pattern and a process of the metal grid by using an optical characteristic function. The stacked component in the display may be adjusted according to an actual design. The pattern and the process of the metal grid may include a parameter such as a shape, a size, a line width, a thickness, or the like of a grid subunit in the metal grid. The optical characteristic includes optical transmittance of the display formed by using the foregoing components and a generated moire, to determine whether a user requirement is met.

For the electrical characteristic, it may be determined whether a typical square resistance of the metal grid meets a requirement of the electrical characteristic based on the pattern and the process of the metal grid by using an electrical characteristic function. In addition, an antenna pattern may be formed by cutting on the metal grid, to form a first antenna element. It may be determined, based on a corresponding antenna parameter, for example, isolation, efficiency, and a bandwidth that is obtained by the first antenna element by using an electromagnetic function, whether an electrical characteristic requirement is met, that is, whether a communication requirement of the electronic device is met. Further, after the antenna pattern is determined, a structure of an FPC connected to the antenna element may be determined based on different antenna elements, for example, a wave-trap structure on the FPC and a binding process of a connection region between the FPC and the metal grid.

In the several embodiments provided in this application, it should be understood that, the disclosed system, apparatus, and method may be implemented in other manners. For example, the foregoing apparatus embodiments are merely examples. For example, division of the units is merely logical function division and may be other division during actual implementation. For example, a plurality of units or components may be combined or integrated into another system, or some characteristics may be ignored or not performed. In addition, the shown or discussed mutual couplings, direct couplings, or communication connections may be implemented through some interfaces. The indirect couplings or communication connections between the apparatuses or units may be implemented in electrical or another form.

The foregoing descriptions are merely specific embodiments of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device, comprising a display apparatus, wherein the display apparatus, comprises a cover plate, a display panel, a metal grid, and a transparent dielectric layer, wherein the transparent dielectric layer is disposed between the cover plate and the display panel;

the metal grid comprises a plurality of grid subunits, and is located on a surface of the transparent dielectric layer;

the metal grid comprises a first region and a second region, and a gap is formed between the first region and the second region; and the first region comprises a first antenna element, the first antenna element comprises a radiation component and a feed component, one end of the feed component is electrically connected to the radiation component, and a width of the feed component is greater than or equal to a width of each of the plurality of grid subunits, wherein the radiator component comprises a first radiator, a second radiator, a third radiator, and a fourth radiator distributed in a 2×2 array, and the first radiator and the third radiator are disposed opposite to each other; and the feed component comprises a first feed line and a second feed line, one end of the first feed line is electrically connected to the first radiator and the second radiator separately. and one end of the second feed line is electrically connected to the second radiator and the third radiator separately.

2. The electronic device according to claim 1, wherein each grid subunit is rhombic.

3. The electronic device according to claim 2, wherein the width L1 of the feed component satisfies the following formula:

$$L1 \geq 2 \times L2 \times \sin\frac{\theta}{2},$$

L2 represents a side length of each grid subunit, and θ represents an included angle in each grid subunit in a current direction of the feed component.

4. The electronic device according to claim 3, wherein an acute angle in each grid subunit is between 45° and 90°.

5. The electronic device according to claim 2, wherein a width corresponding to an acute angle in each grid subunit is between 250 μm and 300 μm.

6. The electronic device according to claim 2, wherein a width corresponding to an obtuse angle in each grid subunit is between 400 μm and 450 μm.

7. The electronic device according to claim 2, wherein the width of each grid subunit is less than 500 μm.

8. The electronic device according to claim 1, wherein the feed component comprises at least one of the plurality of grid subunits in a width direction.

9. The electronic device according to claim 1, wherein a width of the gap formed between the first region and the second region is greater than or equal to 6 μm.

10. The electronic device according to claim 1, wherein based on the first feed line performing feeding, an electrical signal in the first radiator is coupled to the fourth radiator through the gap, and an electrical signal in the second radiator is coupled to the third radiator through the gap; and based on the second feed line performing feeding, an electrical signal in the second radiator is coupled to the first radiator through the gap, and an electrical signal in the third radiator is coupled to the fourth radiator through the gap.

11. The electronic device according to claim 1, wherein the display apparatus further comprises a flexible printed circuit (FPC);

one end of the FPC is electrically connected to the first feed line and the second feed line, and the other end of the FPC is electrically connected to a feed unit of the electronic device; and a wave-trap structure is disposed on the FPC, and the wave-trap structure comprises a slot-type structure or a C-type structure.

12. An electronic device, comprising a display apparatus, wherein the display apparatus, comprises a cover plate, a display panel, a metal grid, and a transparent dielectric layer, wherein the transparent dielectric layer is disposed between the cover plate and the display panel;

the metal grid comprises a plurality of grid subunits, and is located on a surface of the transparent dielectric layer:

the metal grid comprises a first region and a second region, and a gap is formed between the first region and the second region; and the first region comprises a first antenna element, the first antenna element comprises a radiation component and a feed component, one end of the feed component is electrically connected to the radiation component, and a width of the feed component is greater than or equal to a width of each of the plurality of grid subunits, wherein the first region further comprises a second antenna element;

an operating band of the first antenna element and the second antenna element comprises a first band; and a distance between the first antenna element and the second antenna element is greater than a half of a first wavelength, and the first wavelength is a wavelength corresponding to a center frequency of the first band.

13. The electronic device according to claim 12, wherein the first band is 24.25 GHz to 29.5 GHZ, or 37.5 GHz to 43.5 GHz.

14. The electronic device according to claim 1, wherein a width of a metal line that encloses each grid subunit is less than or equal to 2 μm.

15. The electronic device according to claim 1, wherein a thickness of a metal line that encloses each grid subunit is between 0.7 μm and 4 μm.

16. The electronic device according to claim 12, wherein a width of a metal line that encloses each grid subunit is less than or equal to 2 μm.

17. The electronic device according to claim 12, wherein a thickness of a metal line that encloses each grid subunit is between 0.7 μm and 4 μm.

18. The electronic device according to claim 12, wherein each grid subunit is rhombic.

19. The electronic device according to claim 18, wherein the width, L1, of the feed component satisfies the following formula:

wherein

L2 represents a side length of each grid subunit, and θ represents an included angle in each grid subunit in a current direction of the feed component.

20. The electronic device according to claim 18, wherein the width of each grid subunit is less than 500 μm.

* * * * *